United States Patent [19]

Tomite

[11] Patent Number: 4,510,407
[45] Date of Patent: Apr. 9, 1985

[54] PERMANENT MAGNET TYPE MOTOR HAVING IMPROVED POLE STRUCTURE

[75] Inventor: Tosio Tomite, Katsuta, Japan

[73] Assignee: Hitachi, Ltd., Tokyo, Japan

[21] Appl. No.: 502,632

[22] Filed: Jun. 9, 1983

[30] Foreign Application Priority Data

Jun. 11, 1982 [JP] Japan .............................. 57-100048

[51] Int. Cl.³ ........................................ H02K 21/26
[52] U.S. Cl. ................................ 310/154; 74/7 R; 310/192
[58] Field of Search ............... 310/154, 254, 152, 181, 310/185, 188, 192; 74/7 R

[56] References Cited

U.S. PATENT DOCUMENTS

| 4,237,393 | 12/1980 | Landgraf | 310/154 |
| 4,383,193 | 5/1983 | Tomite et al. | 310/154 |
| 4,471,252 | 9/1984 | West | 310/154 |

FOREIGN PATENT DOCUMENTS

| 1212841 | 3/1960 | France | 310/154 |
| 924347 | 4/1963 | United Kingdom | 310/154 |

*Primary Examiner*—William H. Beha, Jr.
*Assistant Examiner*—D. L. Rebsch
*Attorney, Agent, or Firm*—Antonelli, Terry & Wands

[57] ABSTRACT

A permanent magnet type motor having a stator which comprises a yoke, a plurality of main magnetic poles made of permanent magnets, and a plurality of auxiliary magnetic poles, each of the main magnetic poles and each of the auxiliary magnetic poles being juxtaposed on the inner peripheral surface of the yoke, wherein each of the auxiliary magnetic poles has an axial length larger than the thickness of an armature core and smaller than the axial length of each of the main magnetic poles, wherein each of the main magnetic poles has an inner diameter smaller than the inner diameter of each of the auxiliary magnetic poles, wherein each of the main poles, before being secured on the yoke, is machined to have the inner diameter smaller than the predetermined inner diameter by a thickness to be machined, and wherein each of the main magnetic poles is machined to have the predetermined inner diameter after it has been secured together with each of the auxiliary magnetic poles onto the yoke.

21 Claims, 12 Drawing Figures

FIG. I
PRIOR ART
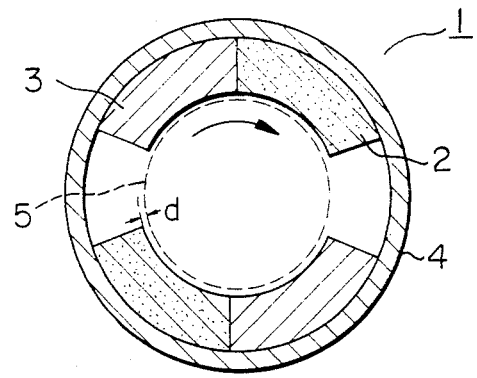
FIG. 2
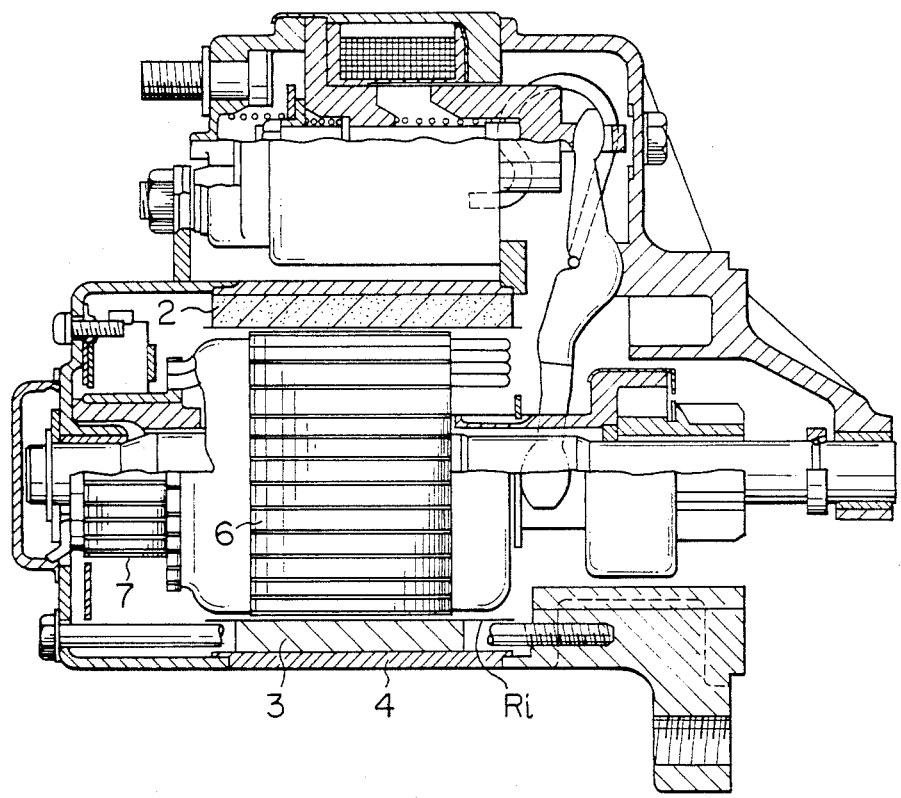

PERMANENT MAGNET TYPE MOTOR HAVING IMPROVED POLE STRUCTURE

The present invention relates to a permanent magnet type motor suitable for use for starting an internal combustion engine such as an engine of a small automobile and, particularly, to a DC motor of a permanent magnet type having the main pole made of a permanent magnet material and the auxiliary pole made of soft iron.

In the conventional permanent magnet type DC motor, a main pole 2 made of a permanent magnet and an auxiliary pole 3 made of material with higher reversible permeability than that of the main pole 2 are juxtaposed to form a complete magnetic pole as shown in FIG. 1 so that the magnetic flux is created in the magnetizing field region due to the armature upon rotation in the direction of the arrow reaction by an armature 5 thereby to obtain the characteristics of a series motor, as disclosed, for example, in U.S. Pat. No. 3,594,599. However, permanent magnet type DC motors having such structure still have inferior torque characteristics for a heavy load as compared with wound-pole type DC motors, and therefore further improvement in the torque characteristics is desired.

In order to improve the torque characteristics of a permanent magnet type DC motor, it is important for the motor to have a magnetic circuit with less leakage of flux by effectively utilizing the flux caused by the armature reaction. Conventionally, the permanent magnet pole has been designed to have an axial length 1.1–1.3 times the thickness or axial length of the armature core and the auxiliary pole to have an axial length as large as the thickness of the armature core, and an increase in the effective flux by further increasing the axial length of the permanent magnet pole and auxiliary pole has not been expected.

As concerns the machining of the inner and outer surfaces of the pole, the auxiliary pole 3, generally made of soft iron, can be machined with sufficient accuracy, while on the other hand, the main pole 2 is generally a ferrite magnet which is very hard and brittle as suggested by the term "ceramic magnet" and it cannot be machined with sufficient accuracy even though a special machining process using cutting tools coated with diamond particles is utilized for the machining. On this account, if assembling procedures were to be taken such that the inner and outer surfaces of the main pole 2 are machined to the specified dimensions and then secured on the interior surface of the yoke 4 contiguously to the auxiliary pole 3 whose inner and outer surfaces have also be machined in advance, various errors such as the machining errors on the inner and outer surfaces of the main pole 2, distortion and dimensional error of the cylinder would be added together, resulting in a smaller inner diameter of the main pole 2 than the outer diameter of the armature 5, making impossible the assembling of the armature 5 into the stator 1. In order to avoid such a situation, in the prior art manufacturing process, the inner surface of the main pole 2 has been machined so that the inner diameter of the main pole 2 has an excessive dimension for compensating the above-mentioned total errors. This design procedure is apt to result in an excessive air gap d between the outer surface of the armature 5 and the inner surface of the main pole 2 beyond the minimum gap necessary for preventing the contact of both surfaces. An increased air gap d implies an increase in the magnetic resistance of the air gap d which is the dominant part of the overall magnetic resistance in the magnetic circuit formed by the field system. Accordingly, the magnetic flux in the magnetic path decreases in proportion to the increase of the air gap d, causing the output torque of the motor to decrease. Namely, the enhanced torque characteristics by the provision of the auxiliary pole is significantly sacrificed by the reduced magnetic flux caused by the increased air gap as mentioned above.

It is an object of the present invention to provide a permanent magnet type DC motor having enhanced torque characteristics for a heavy load.

According to the present invention, there is provided a permanent magnet type motor having pairs of a main pole made of a permanent magnet and an auxiliary pole juxtaposed on the inner surface of a cylindrical yoke disposed concentrically with the armature core to form a stator of the motor, wherein the auxiliary pole has an axial length larger than the thickness of the armature core and smaller than the axial length of the main pole, wherein the main pole has a smaller inner diameter than that of the auxiliary pole, and the main pole, before being secured on the yoke, is machined to have an inner diameter which is smaller than the final inner diameter by the amount of subsequent grinding, and wherein after the main pole has been secured together with the auxiliary pole onto the yoke the main pole is machined to have the final inner diameter.

The above and other objects, features and advantages of the present invention will be apparent from the following detailed description of the preferred embodiments thereof taken in conjunction with the accompanying drawings, in which:

FIG. 1 is a simplified cross-sectional view of the rotor of the conventional permanent magnet type motor;

FIG. 2 is a longitudinal cross-sectional view of the inventive permanent magnet type motor applied to the starter of an internal combustion engine;

FIG. 3 is a side sectional-view taken along the line II—II of FIG. 4 showing the 4-pole permanent magnet type motor as the first embodiment of the present invention, and FIG. 4 is a partial cross-sectional view taken along the lines I-O-I of FIG. 3. In these figures, portions identical to those of FIG. 1 are referred to by the common reference numbers.

Figure 3:
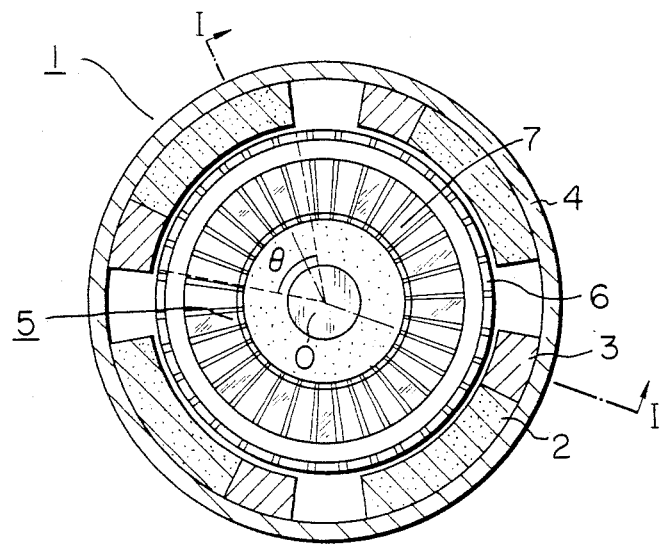
FIG. 3 is a side view broken in part showing the first embodiment of the present invention.
Figure 4:
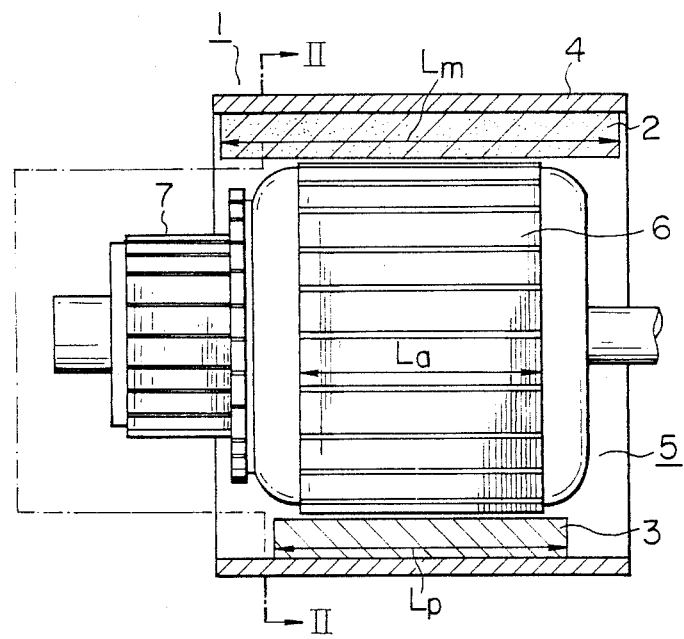
FIG. 4 is a partial cross-sectional view taken along the lines I-O-I of FIG. 3.

A stator 1 has a plurality of magnetic poles, each made up of a main pole 2 having an axial length of Lm and an auxiliary pole 3 of soft iron having an axial length of Lp juxtaposed inside a yoke 4. An armature 5 has a laminated core 6 with a thickness of La with a winding provided around it, and a commutator 7. The dimensions Lm, Lp and La are chosen to have relations: Lm=(1.5 to 2)×La, and Lp=(1.1 to 1.3)×La.

Figure 5:
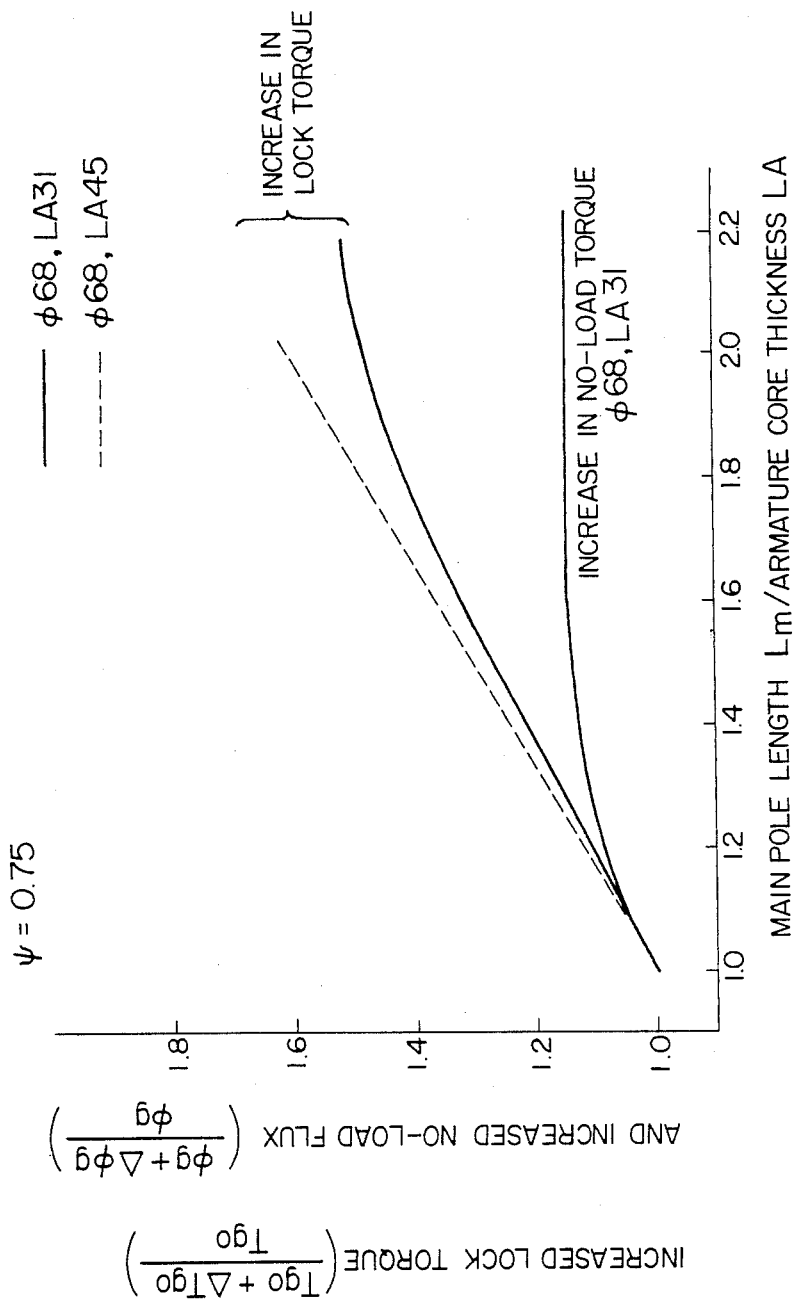
FIG. 5 is a graph showing the relationship between the ratio of the main pole length LM to the armature core thickness LA and the lock torque.

The following describes with reference to FIG. 5 how the relationship between the axial length Lm of the main pole 2 and the thickness of La of the armature 5 affects on the lock torque of the motor. FIG. 5 is plotted for the yoke outer diameter of 68 mm, armature core thickness LA of 31 mm and 45 mm, and $\psi = \theta/90° = 0.75$. In the figure, $T_{go}$ represents the lock torque, $\Delta T_{go}$ represents the increased lock torque, $\phi_g$ represents the no-load flux, and $\Delta \phi_g$ represents the increased no-load flux. As can be seen from the figure, the no-load flux increases very little when the value of Lm/LA increases beyond 1.6, whereas the lock torque increases as the value of Lm/LA increases in both cases of LA=31 mm (shown by the solid line) and LA=45 mm (shown by the dashed line).

Figure 6:
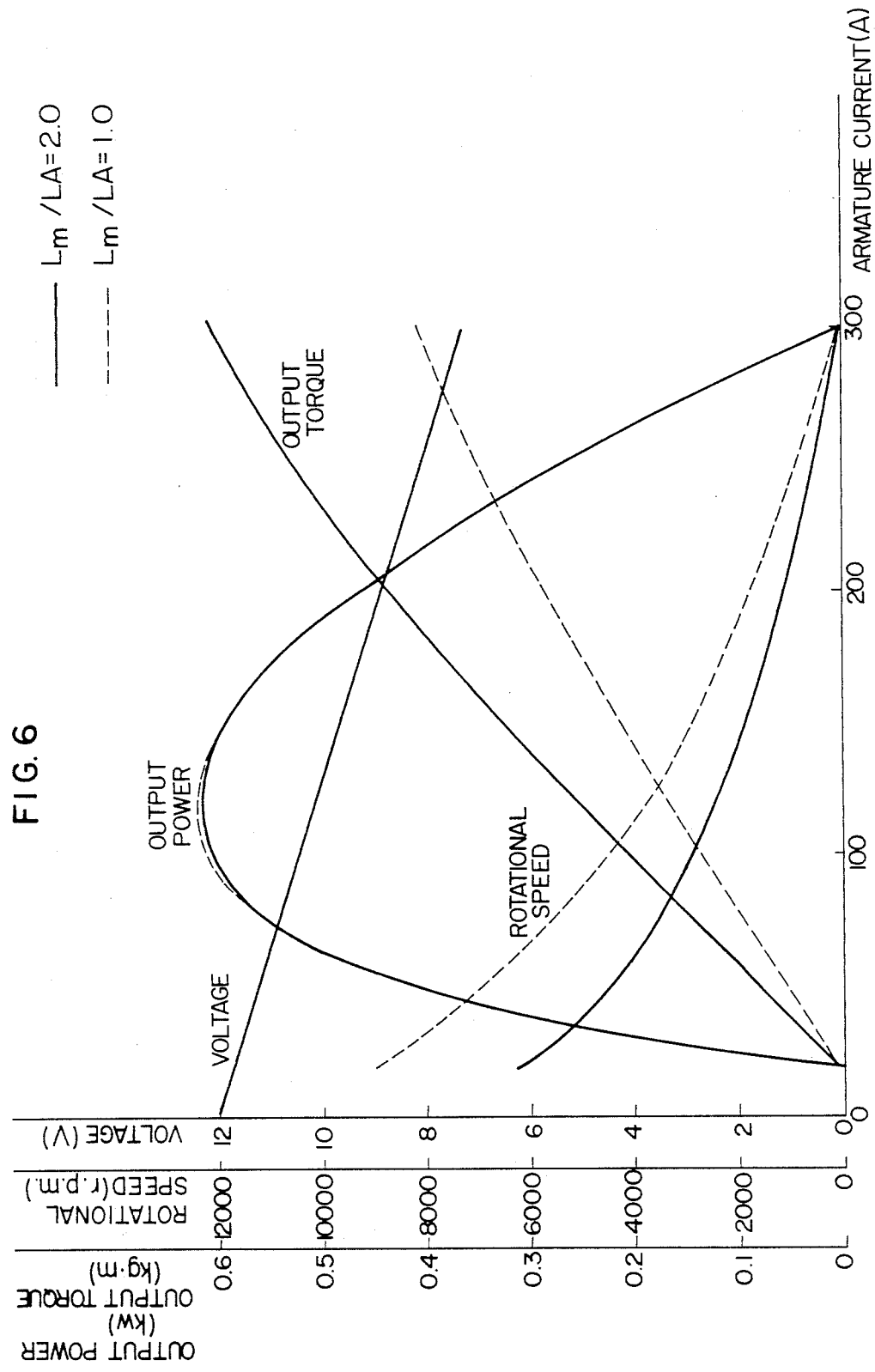
FIG. 6 is a graph showing the relationship among the armature current, terminal voltage, rotational speed, output torque, and output power.

FIG. 6 plots the armature current (amperes), terminal voltage (volts), rotational speed (RPM), output torque (kg-m), and output power (kW), for the comparison between the case of Lm/LA=2.0 (shown by the solid line) and the case of Lm/LA=1.0 (shown by the dashed line). The motor used for the measurement of FIG. 6 has a yoke outer diameter of 68 mm, yoke inner diameter of 63 mm, yoke length of 75 mm, armature outer diameter of 48.2 mm, armature thickness of 31 mm, the number of slots of 21, 3-turn winding of $\phi 1.6$ mm insulated wire, and the main pole thickness of 7 mm. Measurement was carried out based on $\psi = \theta/90° = 0.75$. FIGS. 5 and 6 indicate that the output torque is significantly improved by choosing a larger axial length Lm for the main pole 2 relative to the thickness La of the armature core 6. The relationship between the ratio of the main pole axial length Lm to the armature thickness La and the output torque meets the following experimental equation within the range of the ratio between 1 and 2.

Output torque=(Lm/La)$^{0.62}$

Accordingly, the axial length Lm of the main pole 2 can effectively be increased up to around 2 La.

In general, when the flux distribution of the demagnetizing field caused by the armature of the permanent magnet type DC motor is measured from the demagnetization of the permanent magnet, it is found that the permanent magnet is largely demagnetized because of a high flux density of the armature core and demagnetization also occurs at its axial end portions. The range of demagnetization depends on the magnitude of armature reaction and the air gap between the armature 5 and the main pole 2, and it is, for example, up to 1.3 times the armature thickness La. This fact indicates that the flux distribution caused by the armature reaction ranges not only in the portion of the armature thickness La, but extends to a wider range of 1.2 La to 1.3 La.

In the first embodiment of the invention, the axial length Lp of the auxiliary pole 3 is extended to the range of flux distribution so as to fully utilize the flux, thereby enhancing the torque characteristics for a heavy load. Namely, when a voltage is applied to the armature 5, it starts rotating. When the current is small, the magnetizing effect by armature reaction is also small, and the armature 5 rotates in the flux mainly produced by the permanent magnet 2. When a large current flows in the armature 5 due to a heavy load, the magnetizing effect by armature reaction increases, causing the flux originated from the core 6 of the armature 5 to pass through the extended auxiliary pole, and the flux increases. In addition, the flux originated from the end of the main pole 2 increases due to the reduction of the flux density in the core 6 caused by the increased armature reaction, and this additional flux increase enhances the torque performance. The flux created by the inventive arrangement is larger than the arrangement solely using permanent magnet poles.

The following is an example of design data for the motor manufactured in accordance with the first embodiment of the invention.

Outer diameter of yoke 4: 80 mm,
Thickness of armature core, La: 45 mm
Axial length of auxiliary pole 3, Lp: 52 mm
Axial length of main pole 2, Lm: 70 mm This motor, with the dimensional relationship Lm/La=1.6, proved an enhanced torque performance by 60% as compared with the torque performance of the conventional permanent magnet type DC motor.

Figure 7:
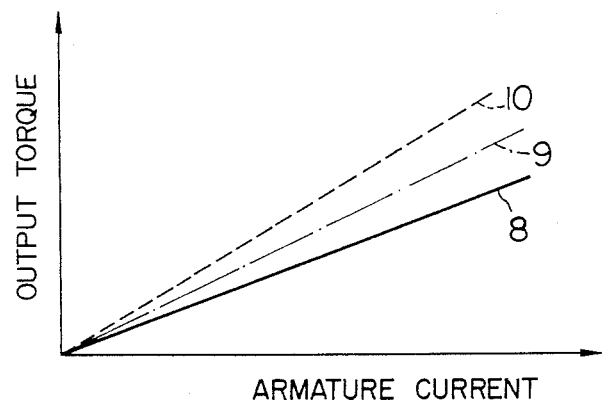
FIG. 7 is a graph comparing the armature current vs. the output torque relationship between the first embodiment of the invention and the conventional permanent magnet type motor.

FIG. 7 shows the output torque vs. armature current relationship of DC motors, where the solid line 8 indicates the DC motor using only conventional main field pole 2 without auxiliary poles, the dash-dot line 9 indicates the DC motor using the conventional main field pole 2 and auxiliary field pole 3, and the dashed line 10 indicates the DC motor using the main field pole 2 and auxiliary field pole 3 according to the first embodiment of the present invention.

The second embodiment of the present invention will now be described with reference to FIGS. 8, 9 and 10. In these figures, portions identical to those in FIG. 1 are referred to by the common reference numbers.

Figure 8:
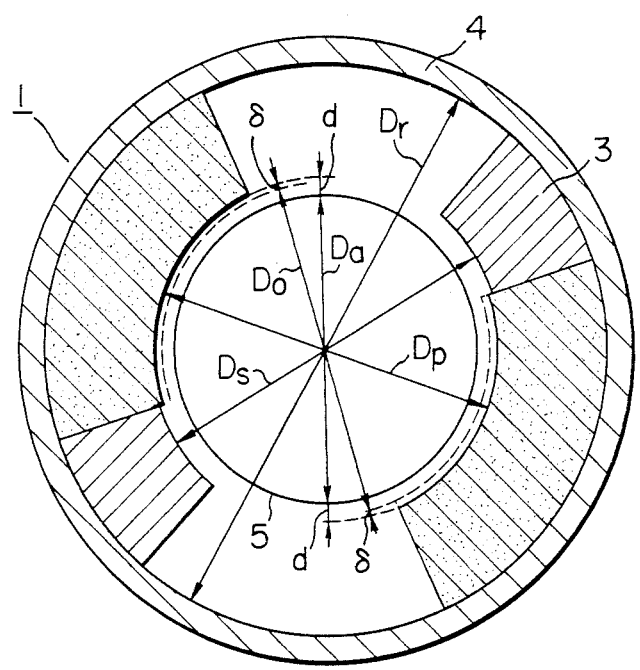
FIG. 8 is a simplified cross-sectional view of the second embodiment of the present invention.

In FIG. 8, the present invention is applied to a 2-pole motor. The main pole 2 is machined to have an inner diameter Do smaller than the final inner diameter Dp, the auxiliary pole 3 is machined to have an inner diameter Ds slightly larger than the final inner diameter Dp of the main pole 2. The main pole 2 and auxiliary pole 3 are secured contiguously on the yoke 4. After the main pole 2 and auxiliary pole 3 have been secured on the yoke 4, the inner surface of the main pole 2 is machined by a thickness of $\delta$ with a special tool coated with diamond particles so that the original inner diameter Do of the main pole 2 is reduced to Dp. The difference between the inner diameter Dp of the machined main pole 2 and the diameter Da of the armature 5 forms the minimum air gap d. The auxiliary pole 3, before being secured on the yoke 4, is machined to have its inner diameter Ds slightly larger than the inner diameter of the machined main pole 2, so that the finished surface of the relatively soft auxiliary pole 3 made of soft iron is not machined by the grinder for machining the main pole 2, and the grinder can be prevented from damage by being jammed by cutting chips of soft iron among diamond particles.

In the second embodiment of the invention, the air gap d can accurately be brought to the specified value irrespective of the total machining and assembling errors, and consequently, the reduction in the flux density caused by an unnecessarily large air gap and the resultant reduction in the output power and torque can be avoided. In addition, the flux increasing effect of armature reaction by the auxiliary pole 3 is cancelled by the flux decreasing effect by the increased air gap, and irreversible demagnetization can be prevented.

The following is an example of design data for the motor manufactured in accordance with the second embodiment of the invention.

Outer diameter of yoke 4: 68 mm
Thickness of armature core 5: 45 mm
Difference between inner diameter Dp of main pole 2 and inner diameter Ds of auxiliary pole 3: 0.1 mm According to this embodiment, the air gap d could be reduced from 0.5–1.0 mm in the conventional arrangement to 0.4–0.5 mm, and the output power was increased by 6.7%, and resistivity of demagnetization was improved by 7%.

The following describes the operation of the excitation system according to the second embodiment of the invention.

Figure 9:
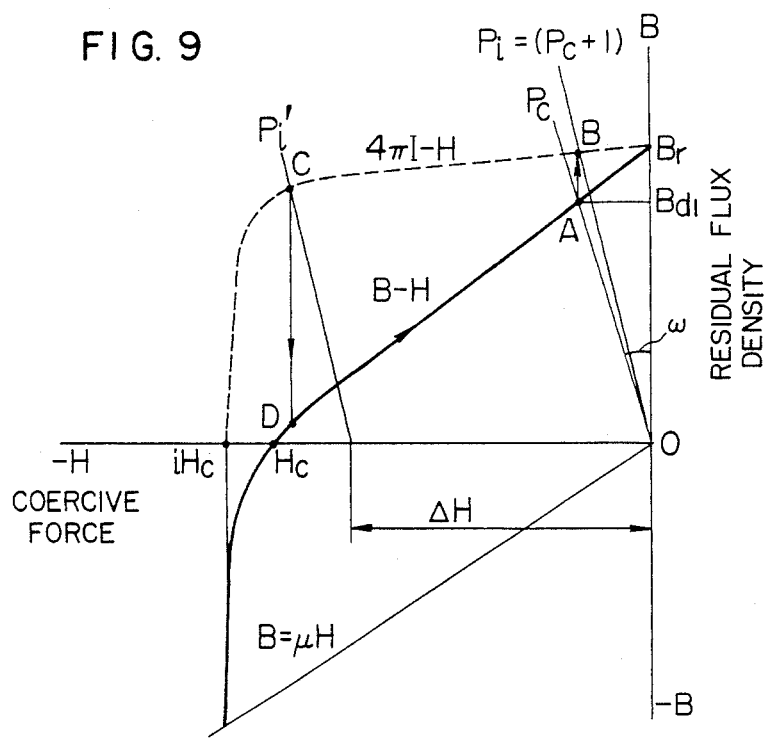
FIG. 9 is a graph explaining the excitation operation by the second embodiment.

FIG. 9 shows the B-H characteristics and $4\pi$I-H characteristics of the permanent magnet used for the main pole 2, where Br is the residual flux density, and Hc and iHc are the coercive forces. Pc is the operating line determined from the total magnetic resistance of the magnetic circuit of the DC motor. According to the present invention, the magnetic resistance of the air gap d, which is the dominant part of the total magnetic resistance, is small, and the operating line Pc intersects the axis of magnetic flux density B at a small angle $\omega$, and the operating line Pc intersects the B-H curve at point A. The magnetic flux density corresponding to point A is $B_{d1}$, and the point on the $4\pi$I-H curve corresponding to point A is B.

If a demagnetizing field $\Delta$H acts due to armature reaction by the rotation of the armature 5, the operating line of the permanent magnet moves via points A→B→C→D as shown by the arrow, and after removal of the demagnetizing field the operating line returns along the B-H curve to point A. Thus, the flux density does not change from $B_{d1}$, i.e., irreversible demagnetization does not occur.

Figure 10:
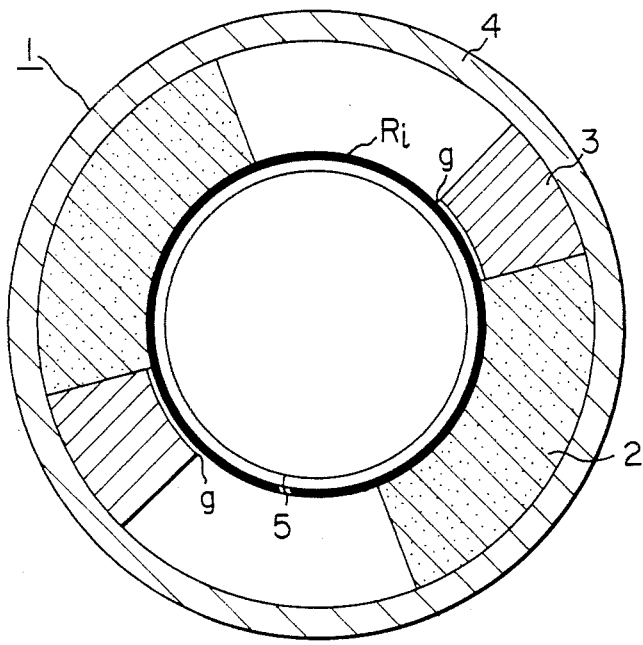
FIG. 10 is a simplified cross-sectional view of the permanent magnet type motor useful to explain an effect of the second embodiment.

FIG. 10 shows another arrangement of the pole structure which is based on the second embodiment, but added by a ring Ri. The ring Ri is of a known part, serving for the protection of the main pole 2 from being broken and pressed onto the armature 5 when an external mechanical shock is applied to the stator 1. In this arrangement, a large contact area is necessary between the ring Ri and the main pole 2 protected by the ring Ri. Owing to the smaller inner diameter of the main pole 2 relative to the inner diameter of the auxiliary pole 3 according to the present invention, a large contact area between the main pole 2 and the ring Ri is obtained merely by setting the outer diameter of the ring Ri equal to the inner diameter of the main pole 2. Namely, if the main pole 2 and auxiliary pole 3 were to be machined to have the same inner diameter, an offset between the two inner diameters would occur due to the machining and assembling errors as mentioned previously. And, if, for example, the inner diameter of the auxiliary pole 3 becomes smaller than that of the main pole 2, the contact area between the main pole 2 to be protected and the ring Ri will be reduced. Such improperness of a reduced contact area between the main pole 2 and the ring Ri can be prevented by the larger inner diameter of the auxiliary pole 3 than that of the main pole 2, in accordance with the present invention, so as to provide a gap g between the ring Ri and the auxiliary pole 3. The effect of the increased contact area between the main pole 2 and the ring Ri is also true of the method of machining the inner surface of the main pole 2 accurately to such an extent that no machining is required after the main pole 2 and auxiliary pole 3 have been secured on the yoke 4.

Figure 11:
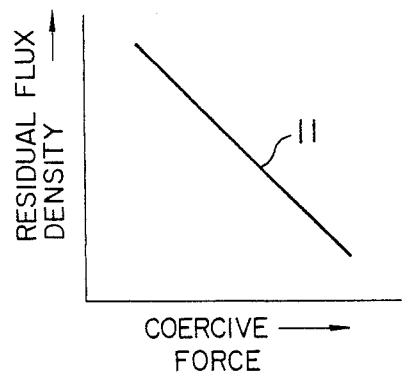
FIG. 11 is a graph showing the characteristics of the ferrite permanent magnet.

FIG. 11 shows the general characteristics of ferrite magnets, where the residual flux density is plotted on the ordinate against the coercive force on the abscissa. As shown by the curve 11, the larger the coercive force, the lower is the residual flux density; conversely, the smaller the coercive force, the higher is the residual flux density. The magnitude of armature reaction acting on the field pole falls into two regions bounded at the center of the pole depending on the direction of the armature current, i.e., the demagnetizing field region and the magnetizing field region. On this account, it is more effective for improving the torque performance to use a permanent magnet having an increasing coercive force toward the end of the decreasing field region, and an increasing residual flux density toward the end of the increasing field region. Such a permanent magnet pole can be realized by utilization of the above-mentioned general characteristics of ferrite magnets.

Figure 12:
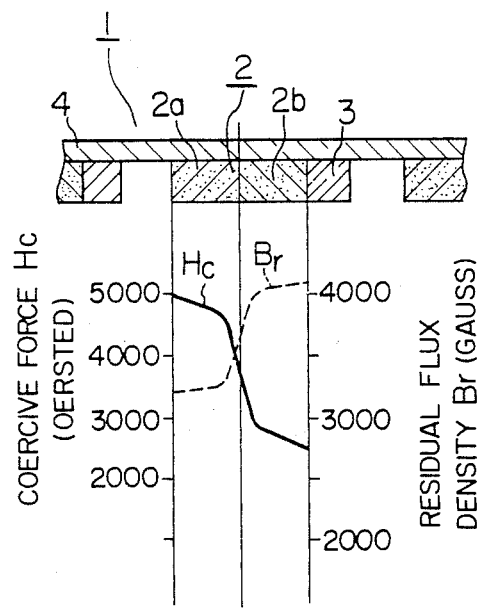
FIG. 12 is an explanatory diagram for the third embodiment of the present invention.

Referring to FIG. 12, the main pole 2 is constituted by a magnet 2a with a large coercive force for the demagnetizing field region and a magnet 2b with a high residual flux density for the magnetizing field region, with both magnets 2a and 2b provided with respective slopes of magnetic characteristics so that the main pole 2 as a whole has a large slope of magnetic characteristics. The magnet 2a has at its left end a coercive force of 5000 oersteds and a residual flux density of 3600 gausses, while the magnet 2b has at its right end a coercive force of 2800 oersteds and a residual flux density of 4100 gausses. This arrangement improves the motor output power by approximately 7% when compared with the permanent magnet type motor using permanent magnets having a coercive force of 4000 oersteds and a residual flux density of 3600 gausses without a slope of the magnetic characteristics.

I claim:

1. A permanent magnet type motor having a stator which comprises a yoke, a plurality of main magnetic poles made of permanent magnets, and a plurality of auxiliary magnetic poles, each of said main magnetic poles and each of said auxiliary magnetic poles being juxtaposed on the inner peripheral surface of said yoke to form respective pairs of juxtapsed main and auxiliary magnetic poles spaced in the circumferential direction by an air gap from other pairs of juxtaposed main and auxiliary magnetic poles, wherein each of said auxiliary magnetic poles has an axial length larger than an axial length of an armature core and smaller than an axial length of each of said main magnetic poles.

2. A permanent magnet type motor according to claim 1, wherein each of said auxiliary magnetic poles has an axial length approximately 1.1 to 1.3 times an axial length of said armature core, and each of said main magnetic poles has an axial length approximately 1.5 to 2.0 times the axial length of said armature core.

3. A permanent magnet type motor according to claim 1, wherein each of said main magnetic poles is formed to have an increasing coercive force and decreasing residual flux density toward an end of a demagnetizing field region due to armature reaction and an increasing residual flux density and decreasing coercive force toward an end of a magnetizing field region, with a portion of said demagnetizing field region with a larger coercive force and a portion of said magnetizing field region with a higher residual flux density being formed with gradual slopes of magnetic characteristics.

4. A permanent magnet type motor having a stator which comprises a yoke, a plurality of main magnetic poles made of permanent magnets and a plurality of auxiliary magnetic poles, each of said main magnetic poles and each of said auxiliary magnetic poles being juxtaposed on the inner peripheral surface of said yoke to form respective pairs of juxtaposed main and auxiliary magnetic poles spaced in the circumferential direction by an air gap from otherpairs of juxtaposed main and auxiliary magnetic poles, wherein each of said main magnetic poles has an inner diameter smaller than an inner diameter of each of said auxiliary magnetic poles, wherein each of said main poles, before being secured on said yoke, is machined to have the inner diameter smaller than a predetermined inner diameter by a thickness to be machined, and wherein each of said main magnetic poles is machined to have the predetermined inner diameter after it has been secured together with each of said auxiliary magnetic poles onto said yoke.

5. A permanent magnet type motor according to claim 4, wherein each of said main magnetic poles is formed to have an increasing coercive force and decreasing residual flux density toward an end of a demagnetizing magnetic field region due to armature reaction and an increasing residual flux density and decreasing coercive force toward and end of a magnetizing field region, with a portion of said demagnetizing field region with a larger coercive force and a portion of said magnetizing field region with a higher residual flux density being formed with gradual slopes of magnetic characteristics.

6. A permanent magnet type motor according to claim 4, wherein each of said auxiliary magnetic poles has an axial length larger than a thickness of an armature core and smaller than an axial length of each of said main magnetic poles.

7. A permanent magnet type motor according to claim 6, wherein each of said auxiliary magnetic poles has an axial length approximately 1.1 to 1.3 times an axial length of said armature core, and each of said main magnetic poles has an axial length approximately 1.5 to 2.0 times the axial length of said armature core.

8. A permanent magnet type motor according to claim 6, wherein each of said main magnetic poles is formed to have an increasing coercive force and decreasing residual flux density toward an end of a demagnetizing field region due to armature reaction and an increasing residual flux density and decreasing coercive force toward an end of a magnetizing field region, with a portion of said demagnetizing field region with a larger coercive force and a portion of said magnetizing field region with a higher residual flux density being formed with gradual slopes of magnetic characteristics.

9. A permanent magnet type motor having an armature core and a cylindrical yoke disposed concentrically with said armature core, comprising a plurality of main magnetic poles made of a permanent magnet material and a plurality of auxiliary magnetic poles disposed on an inner peripheral surface of said yoke, each of said main magnetic poles and each of said auxiliary magnetic poles being juxtaposed in the circumferential direction on said inner peripheral surface to form respective pairs of juxtaposed main and auxiliary magnetic poles spaced in the circumferential direction from other pairs of juxtaposed main and auxiliary magnetic poles, each of said auxiliary magnetic poles having an axial length larger than an axial length of said armature core and smaller than an axial length of each of said main magnetic poles.

10. A permanent magnet type motor according to claim 9, wherein a respective pair of main magnetic pole and an associated auxiliary magnetic pole are juxtaposed without an air gap in the circumferential direction, said auxiliary magnetic poles being made of a nonpermanent magnet material.

11. A permanent magnet type motor according to claim 10, wherein respective ones of said main magnetic poles and said associated auxiliary magnetic poles juxtaposed with each other are spaced from others of said main magnetic poles and said associated auxiliary magnetic poles in the circumferential direction.

12. A permanent magnet type motor according to claim 9, wherein the axial length of each of said auxiliary magnetic poles is approximately 1.1 to 1.3 times the axial length of said armature core, and the axial length of each of said main magnetic poles is approximately 1.5 to 2.0 times the axial length of said armature core.

13. A permanent magnet type motor according to claim 9, wherein each of said main magnetic poles is formed to have an increasing coercive force and decreasing residual flux density toward an end of a demagnetizing field region due to armature reaction and an increasing residual flux density and decreasing coercive force toward an end of a magnetizing field region, with a portion of said demagnetizing field region with a larger coeroive force and a portion of said magnetizing field region with a higher residual flux being formed with gradual slopes of magnetic characteristics.

14. A permanent magnet type motor according to claim 9, wherein each of said main magnetic poles has a predetermined inner diameter smaller than an inner diameter of each of said auxiliary magnetic poles, the inner diameter being measured in the juxtaposed circumferential direction of a respective main magnetic pole and associated auxiliary magnetic pole.

15. A permanent magnet type motor according to claim 14, wherein the process of making said permanent magnet type motor includes the steps of machining each of said main magnetic poles to have an inner diameter smaller than the predetermined inner diameter prior to securing each of said main magnetic poles on said yoke, securing each of said main magnetic poles onto said yoke together with each of said auxiliary magnetic poles, and machining each of said main magnetic poles to the predetermined inner diameter.

16. A permanent magnet type motor having an armature core and a cylindrical unit disposed concentrically with said armature core, comprising a plurality of main magnetic poles made of a permanent magnet material and a plurality of auxiliary magnetic poles disposed on an inner peripheral surface of said yoke, each of said main magnetic poles and each of said auxiliary magnetic poles being juxtaposed in the circumferential direction on said inner peripheral surface to form respective pairs of juxtaposed main and auxiliary magnetic poles spaced in the circumferential direction by an air gap from other pairs of juxtaposed main and auxiliary magnetic poles, each of said main magnetic poles having a predetermined inner diameter smaller than an inner diameter of each of said auxiliary magnetic poles, the inner diameter being measured in the juxtaposed circumferential direction of a respective main magnetic pole and associated auxiliary magnetic poles.

17. A permanent magnet type motor according to claim 16, wherein the process of making said permanent magnet type motor includes the steps of machining each of said main magnetic poles to have an inner diameter smaller than the predetermined inner diameter prior to securing each of said main magnetic poles on said yoke, securing each of said main magnetic poles onto said yoke together with each of said auxiliary magnetic poles, and machining each of said main magnetic poles to the predetermined inner diameter.

18. A permanent magnet type motor according to claim 17, wherein a respective pair of math magnetic pole and an associated auxiliary magnetic pole are juxtaposed without an air gap in the circumferential direction, said auxiliary magnetic poles being made of a non-permanent magnet material.

19. A permanent magnet type motor according to claim 17, wherein each of said auxiliary magnetic poles have an axial length larger than an axial length of said armature core and smaller than an axial length of each of said main magnetic poles.

20. A permanent magnet type motor according to claim 19, wherein the axial length of each of said auxiliary magnetic poles is approximately 1.1 to 1.3 times the axial length of said armature core, and the axial length of each of said main magnetic poles is approximately 1.5 to 2.0 times the axial length of said armature core.

21. A permanent magnet type motor according to claim 20, wherein each of said main magnetic poles is formed to have an increasing coercive force and decreasing residual flux density toward an end of a demagnetizing field region due to armature reaction and an increasing residual flux density and decreasing coercive force toward an end of a magnetizing field region, with a portion of said demagnetizing field region with a larger coercive force and a portion of said magnetizing field region with a higher residual flux being formed with gradual slopes of magnetic characteristics.

* * * * *